(12) United States Patent
Patterson

(10) Patent No.: US 7,240,674 B2
(45) Date of Patent: Jul. 10, 2007

(54) SOLAR TRACKING APPARATUS

(76) Inventor: Michael Terrence Patterson, 8 Richards Road, Narangba, Queensland (AU) 4504

(*) Notice: Subject to any disclaimer, the term of this patent is extended or adjusted under 35 U.S.C. 154(b) by 48 days.

(21) Appl. No.: 10/531,781

(22) PCT Filed: Aug. 25, 2003

(86) PCT No.: PCT/AU03/01080

§ 371 (c)(1),
(2), (4) Date: Apr. 15, 2005

(87) PCT Pub. No.: WO2004/036124

PCT Pub. Date: Apr. 29, 2004

(65) Prior Publication Data

US 2005/0284467 A1   Dec. 29, 2005

(30) Foreign Application Priority Data

Oct. 17, 2002   (AU) ............................ 2002100817
Apr. 1, 2003    (AU) ............................ 2003203512

(51) Int. Cl.
*F24J 2/38*   (2006.01)
*F24J 2/40*   (2006.01)

(52) U.S. Cl. .................. 126/573; 126/583; 126/600; 126/604

(58) Field of Classification Search ........... 126/573, 126/577, 583, 600, 604, 606, 607
See application file for complete search history.

(56) References Cited

U.S. PATENT DOCUMENTS 4,235,222 A * 11/1980 Ionescu ...................... 126/579
5,622,078 A     4/1997 Mattson

FOREIGN PATENT DOCUMENTS

EP     1 241 416     9/2002
WO     WO 92/11496   7/1992

* cited by examiner

*Primary Examiner*—Alfred Basichas
(74) *Attorney, Agent, or Firm*—Hoffman, Wasson & Gitler, P.C.

(57) ABSTRACT

A solar tracking apparatus which is movable from a morning position to an evening position, the apparatus comprising a support means to which a solar device can be supported, a cylinder, the cylinder including a ram which is extendable from and retractable into the cylinder, an expansion chamber which forms part of or which is in fluid connection with the cylinder, a liquid in the cylinder and the expansion chamber, the liquid having a boiling point which is greater than the maximum operating temperature of the cylinder and the expansion chamber, a return means to cause the apparatus to be returned to the morning position, and rotation means associated with the ram to rotate the apparatus from the morning position to the evening position upon extension of the ram.

7 Claims, 11 Drawing Sheets

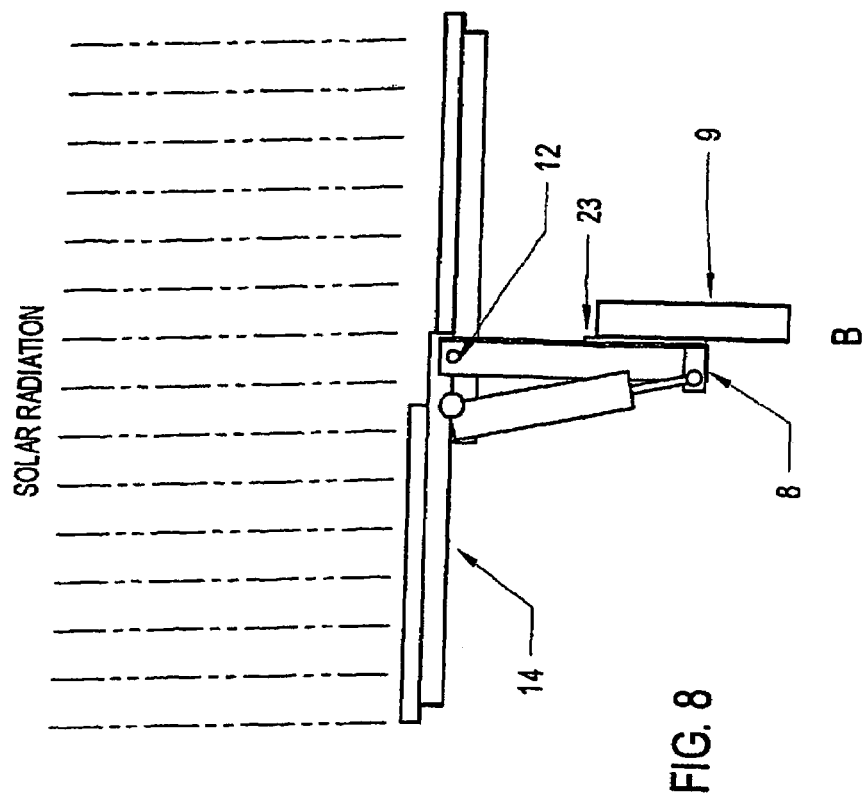
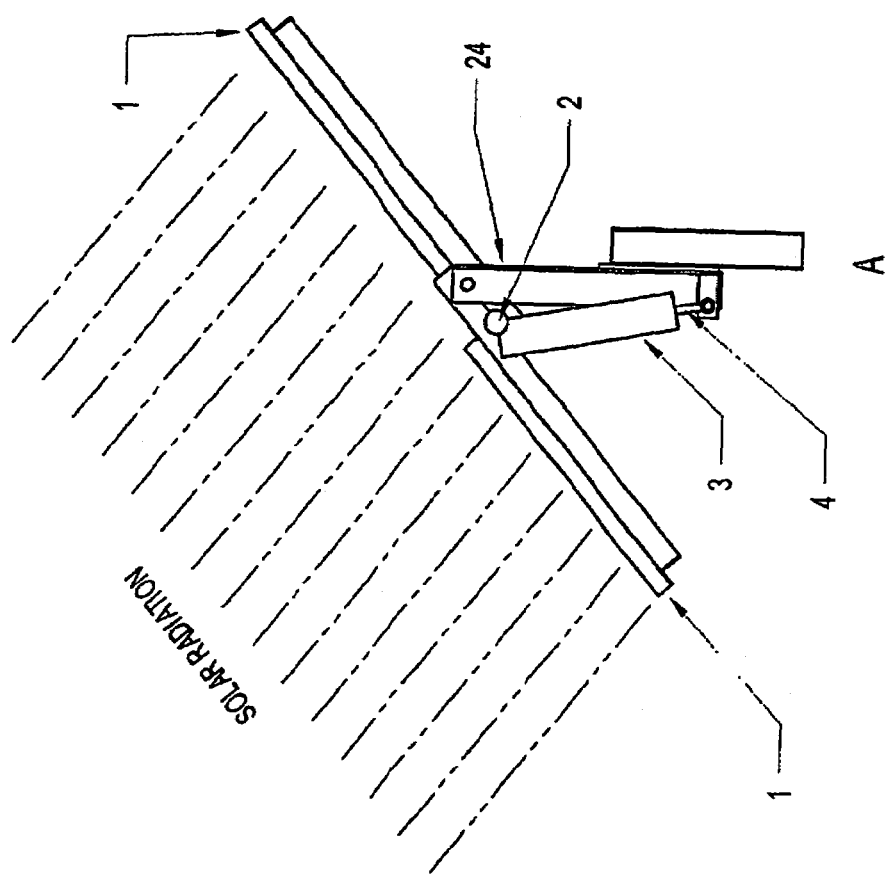
FIG. 8

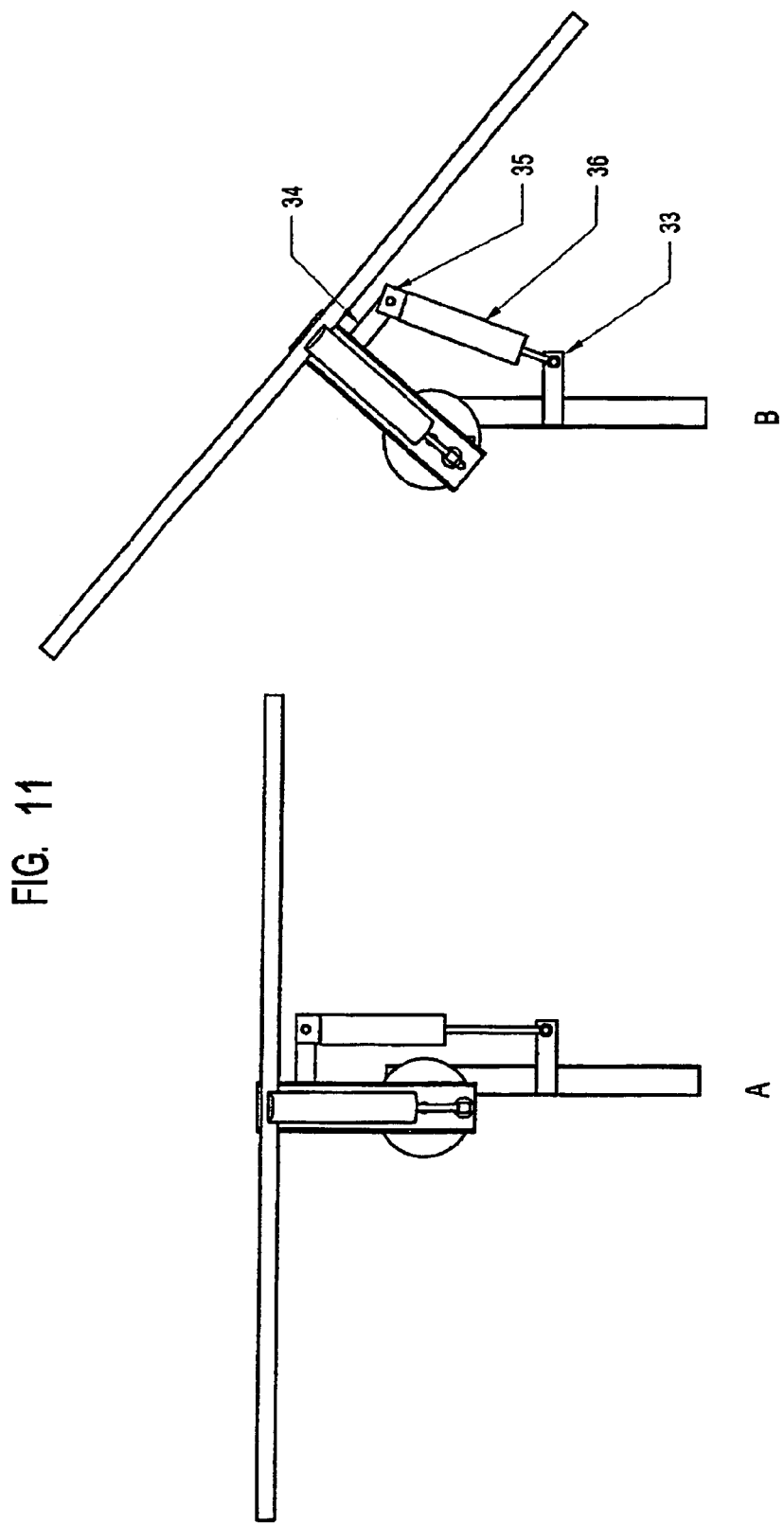

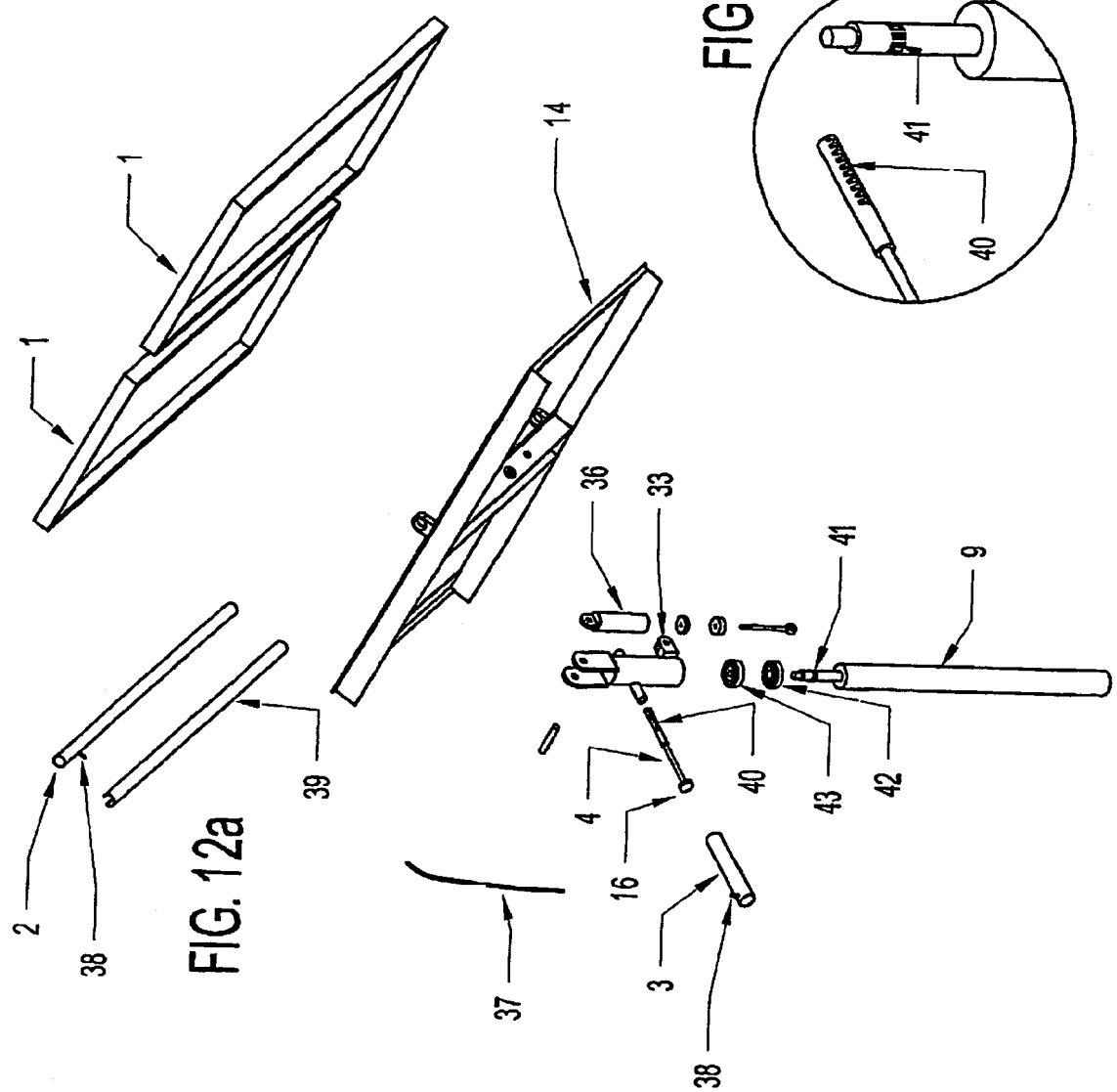

SOLAR TRACKING APPARATUS

FIELD OF THE INVENTION

This invention is directed to a solar tracking apparatus which can be used in association with solar collector panels or any other device which requires tracking. The invention is particularly directed to an apparatus that does not require any electric motors, sensors, or other complicated devices to enable the apparatus to track the movement of the sun.

BACKGROUND ART

There are many devices that use the energy of the sun to provide a useful benefit. As an example, solar cells are often used to convert the energy of the sun into electricity. These devices are often used in remote locations to power pumps, lights, telecommunication devices and the like and must be extremely robust and reliable. There are also other devices that require the energy of the sun, for successful operation, such as water heating devices. The effectiveness of these devices is generally improved if the device can track the movement of the sun to enable the device to absorb as much as possible of the sun's energy. Therefore, it is well known to provide some form of solar tracking apparatus.

A common type of apparatus uses one or more photo-electric cells which are operatively associated with some form of electric drive motor. There are several disadvantages with this type of apparatus including the fragile nature of the photoelectric cells, and the need to have a source of electric power, such as battery power, or electricity generated from the solar cells. This type of apparatus requires a relatively high degree of servicing, maintenance, and repair, and therefore does not find particular use in remote locations.

An attempt has been made to do away with the need for electric motors and photoelectric cells. For instance, international patent application WO 92/11496 describes an apparatus which has two cylinders. Each cylinder is filled with a low boiling liquid (which can include ether). Around each cylinder is a parabolic reflector. One cylinder and its parabolic reflector faces the east and the other cylinder and its parabolic reflector faces the west. As the sun rises in the east, the sun's rays will be concentrated by the parabolic reflector onto the east facing cylinder to boil the liquid in the cylinder to create a gas which causes the cylinder ram to extend and this causes rotation of a framework on which solar cells are attached. An advantage with this apparatus is that photo-electric cells and electric motors are not required. However one main disadvantage is that the parabolic reflectors are relatively high maintenance and the reflector (or the transparent glass or plastic cover) must be kept very clean. Also, significant heat is required to boil the liquid into the gas which means that the apparatus may not work immediately. Moreover, working with gas requires particular design principles and the overall effect is that this type of apparatus is not entirely reliable and robust.

A further disadvantage with many existing solar tracking devices is that the device does not return back to the "east facing" position during the night and only does so at the beginning of the next day. This makes this type of device less efficient.

A further disadvantage with many existing solar tracking devices is that the devices are not particularly stable or effective under high wind conditions Therefore, there would be an advantage if it were possible to develop a solar tracking apparatus that did not require photoelectric cells that did not require an electric motor to track the apparatus, that did not require parabolic reflectors, and that did not require boiling a liquid into a gas to provide the working force for a cylinder.

It will be clearly understood that, if a prior art publication is referred to herein, this reference does not constitute an admission that the publication forms part of the common general knowledge in the art in Australia or in any other country.

OBJECT OF THE INVENTION

It is an object of the invention to provide a solar tracking apparatus which may overcome at least some of the above-mentioned disadvantages or provide a useful or commercial choice.

In one form, the invention is directed to a solar tracking apparatus which is movable from a morning position to an evening position, the apparatus comprising a support means to which a solar device can be supported, a cylinder, the cylinder having a ram which is extendable from and retractable into the cylinder, an expansion chamber which forms part of or which is in fluid connection with the cylinder, a liquid in the cylinder and the expansion chamber, the liquid having a boiling point which is greater than the maximum operating temperature of the cylinder and the expansion chamber, a return means to cause the apparatus to be returned to the morning position, and a rotation means associated with the ram to rotate the apparatus from the morning position to the evening position upon extension of the ram.

Typically, the morning position will be the east facing position or position which faces substantially east (it being appreciated that the sun does not rise exactly in the east over a year) and the evening position will be the west facing position or position which faces substantially west.

The solar device may comprise solar cells or other devices which absorb solar radiation, these including water heating devices, and the like, and no particular limitation should be placed on the term "solar device". The term "solar device" can comprise a single device, a plurality of devices and the like.

The expansion chamber can be positioned such that liquid in the expansion chamber is initially heated mainly by the ambient air temperature to cause initial extension of the ram, and is then heated mainly by solar radiation [i.e. direct contact with the sun] to cause further extension of the ram.

Thus, the apparatus uses the thermal expansion of a liquid to rotate the apparatus from the east to the west and does not require the use of any electric motors, photovoltaic cells, or the need to boil a liquid (which requires parabolic reflectors or other strong heating means). In an embodiment, the apparatus moves by combination of radiant heat (direct contact with sunlight) and ambient heat (air temperature). The expansion chamber is gradually heated by the surrounding air as the sun rises in the morning causing the liquid to expand. The expansion causes the ram to displace which in turn causes rotation of the apparatus. The apparatus is rotated steadily until it approaches in approximately horizontal position which will typically be during midday. As the sun passes the midday position, the expansion chamber is progressively exposed to direct sunlight (radiant heat) which causes further expansion of the liquid and therefore further rotation of the apparatus. During night-time the liquid cools and contracts permitting the return means to rotate the apparatus back to the easterly position.

The apparatus preferably uses a clever combination of ambient heating and direct solar heating to enable the apparatus to track from the east to the west even as the ambient temperature decreases in the afternoon. Thus, the apparatus can initially use primarily ambient heating to expand the liquid to cause the apparatus to begin tracking from the east (morning) position to the west (evening) position, and can then use direct solar heating to cause the liquid to expand even further (and therefore extend the ram even further) even when the ambient temperature begins to decrease in the afternoon.

In one form, this is achieved simply yet effectively by positioning the expansion chamber on the apparatus in such a manner that it can initially absorb heat from the surrounding air and later on, when the apparatus is partially rotated, the expansion chamber is exposed directly to the sun's radiation.

In a broader form, the invention resides in a solar tracking apparatus which uses volumetric expansion of a liquid only as the motive source.

The solar tracking apparatus can be used to support any device that requires solar energy. The device will typically comprise solar cells but the invention need not be limited to this precise use and the apparatus can also be used to support and rotate other devices which may include water heating devices, air heating devices, or any other suitable device.

The support means can be quite varied providing that it functions to support a solar device or other device that requires solar energy. If the solar device comprises solar cells, the support means will typically comprise a support platform, support frame, support bracket, supporting rods, supporting rails, a supporting grid and the like. Other types of support means may be used depending on the solar device which is to be supported.

The apparatus comprises at least one cylinder which has a ram. The cylinder will preferably be such that the stroke of the ram is between 50-400 millimeters and more preferably between 50-200 millimeters. The internal volume of the cylinder can vary and will typically be between 50-500 milliliters. For larger systems, the cylinder may be larger or a plurality of cylinders may be provided.

The expansion chamber may comprise a hollow member which will typically comprise a tube. The tube will typically be liquid tight and be in fluid communication with the cylinder. The expansion chamber will typically be filled with a liquid which is selected to provide a desirable increase in volume upon increasing temperature of the liquid. The expansion chamber will typically have a length of between 10-200 centimeters and a diameter of between 10-100 millimeters. This of course can vary depending upon the size of the apparatus. The expansion chamber may be coupled directly to the cylinder or may be coupled indirectly to the cylinder by means of a connecting tube or other form of conduit. If a connecting tube is provided, it may be flexible. The expansion chamber may comprise a number of sub-chambers which are either connected to each other or connected to the cylinder. The expansion chamber may be coated or otherwise treated to improve absorption of radiant heat and/or ambient heat. For instance, the expansion chamber may be coated with a black radiation absorbing paint. If desired, insulation means may be provided to minimize undesirable cooling of the liquid within the expansion chamber. Thus, it is envisaged that the expansion chamber may be coated with a radiation absorbing paint on the surface of the chamber which will be in direct contact with the sun's rays, and may be insulated on parts of the chamber which will not be in direct contact with the sun's rays. The expansion chamber may also form part of the cylinder and may comprise a simple extension of the cylinder.

The liquid which is used in the chamber and the cylinder may be selected from any liquid which has a suitable volumetric expansion coefficient. However, it may also be desirable to choose a liquid which does not cause corrosion of the internal parts of the apparatus, can assist in lubricating the apparatus and the like. Various liquids can be used although it is desirable to ensure that the boiling point of the liquid is higher than the working temperature of the apparatus. Even in a harsh desert environment, it is envisaged that the working temperature of the apparatus will not exceed 60 degrees centigrade (it being appreciated that the apparatus does not require any parabolic reflectors and the like to greatly increase the temperature of the liquid) and therefore it is envisaged that a suitable liquid will be one having a boiling point of >60 degrees centigrade. It is found that a mineral oil such as an engine oil is suitable, and the oil as well as having a suitable boiling point, can also lubricate and prevent corrosion of the internal components of the apparatus. Other oils and hydrocarbons may also be suitable. Certain plant oils are also suitable and these can include canola oil, sunflower oil, peanut oil, grape seed oil and the like. Certain liquid alcohols are suitable liquids and especially alcohols having a boiling point of >60 degrees centigrade. Ethanol is found to be a suitable alcohol as is propanol, isopropanol, and butanol. High boiling point ethers, ketones, esters and the like may also be suitable liquids, it being appreciated that the liquid can be chosen based on its volumetric expansion coefficient, cost, safety (i.e. toxicity and flammability), corrosive effects on the cylinder etc.

It is preferred that the entire expansion chamber and cylinder are filled with the liquid as any gas may reduce the effectiveness of the extension and retraction of the ram.

The apparatus may be provided with a return means to cause the apparatus to return back to the morning position during nighttime. The return means may comprise a simple spring or a plurality of springs) which is/are sufficient to return the apparatus back to the morning position but does not unduly interfere with the operation of the ram. However, the return means may comprise other types of biasing means such as elastic members, compressive members and the like. It is also envisaged that the return means may comprise a "vacuum cylinder" which becomes progressively more under vacuum during rotation of the apparatus from the morning position to be evening position and then can return back to the rest position causing the apparatus to move back from the evening position to the morning position. It is also envisaged that the apparatus may be weighted such that gravity will cause the apparatus to return to the morning position.

The apparatus has a rotation means which is associated with the ram to rotate the apparatus from the morning position to the evening position. The rotation means may comprise a simple mechanical coupling which is reliable and robust. The mechanical coupling may comprise a crank arm which is attached to a pivot tube, the pivot tube being attached to the support means to rotate the support means from the morning position to the evening position and vice versa. Alternatively, the mechanical coupling may comprise a rack and pinion arrangement where the rack is attached or forms part of the ram. Various other types of rotation means are envisaged which can be used to convert the linear motion of the ram into rotating motion of the apparatus.

The apparatus may also be provided with an additional rotation means to enable the apparatus to rotate about substantially vertical axis. In this version, the apparatus may be pre-inclined and rotated about a vertical axis. This additional rotation means may also comprise a cylinder and ram which may be substantially as described above except that the ram causes pivoting or rotation of the apparatus about a vertical axis.

The apparatus may be mounted a support post, or any other type of supporting member.

BRIEF DESCRIPTION OF THE DRAWINGS

Embodiments of the invention will be described with reference to the following drawings in which:

FIGS. 8A and 8B are partial sectional views of the device shown in FIG. 6 showing two positions of rotation.

FIGS. 11A and 11B Illustrate the view of FIG. 9 with the addition of a thermal hydraulic cylinder illustrated in FIG. 4 to control north-south orientation.

FIGS. 12A and 12B illustrate a vertical rotation modification.

BEST MODE

Figure 1:
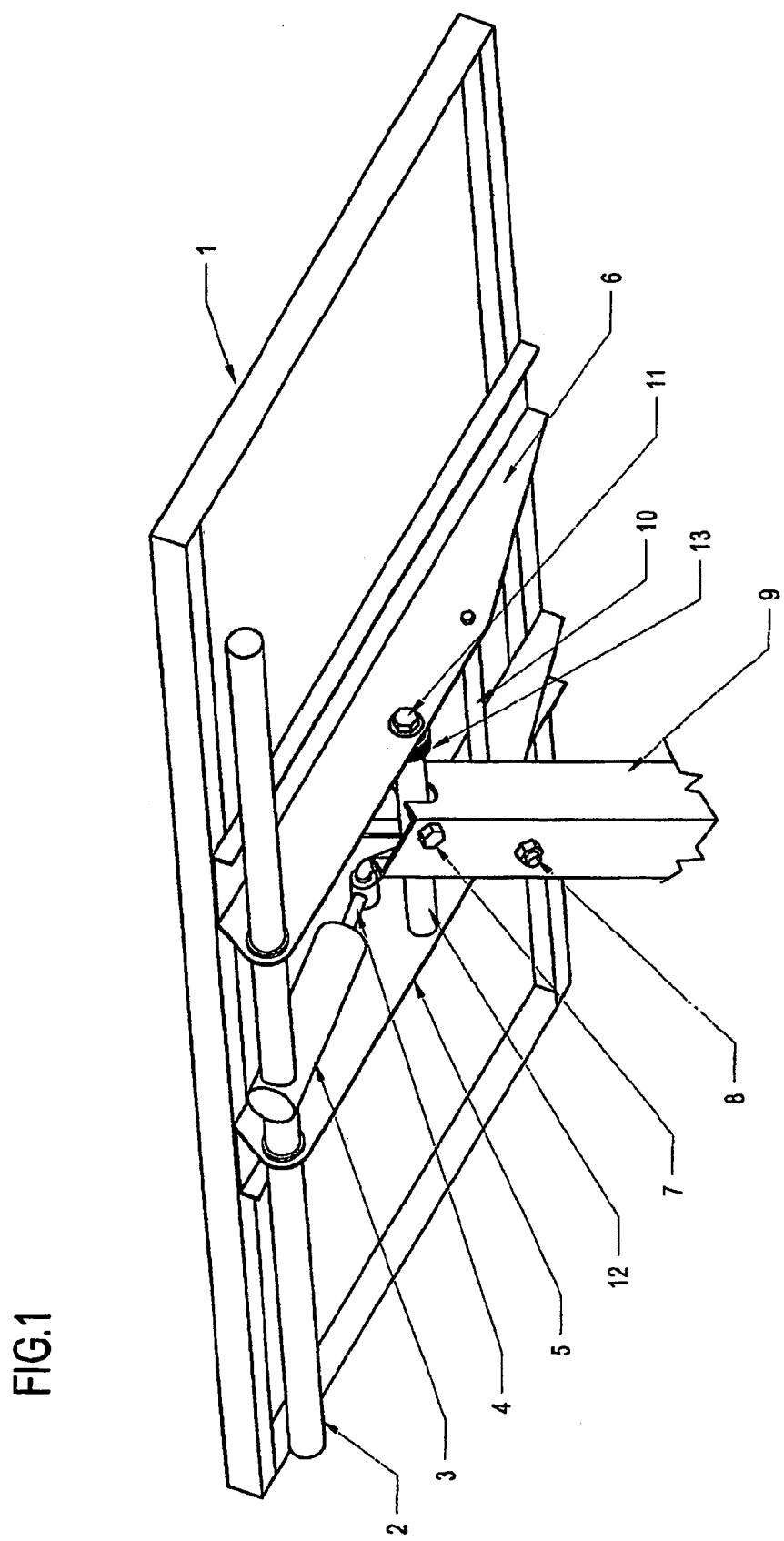
FIG. 1 is an isometric view showing one embodiment of a two-axis tracker for a single photovoltaic panel.
Figure 3:
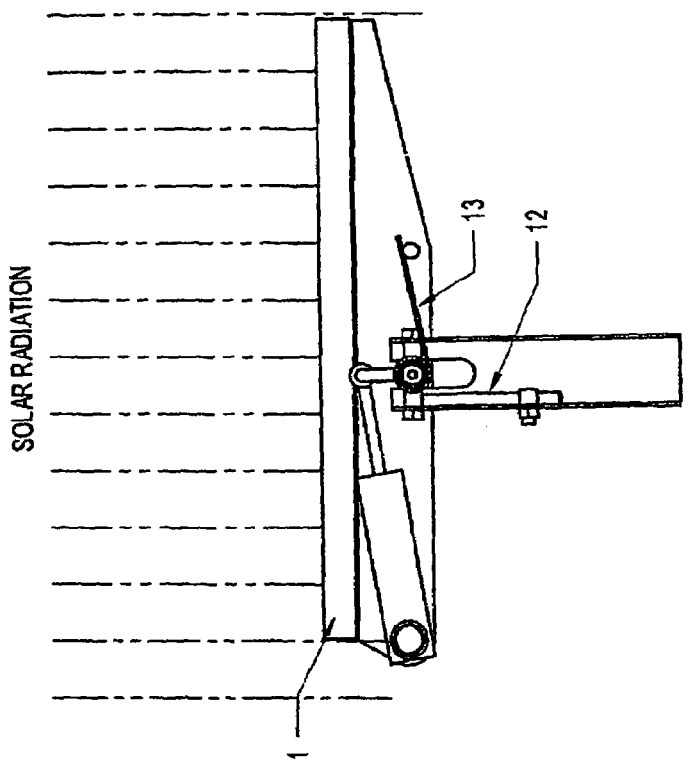
FIG. 2 and FIG. 3 are sectional views of the device depicted in FIG. 1 showing two positions of rotation
Figure 2:
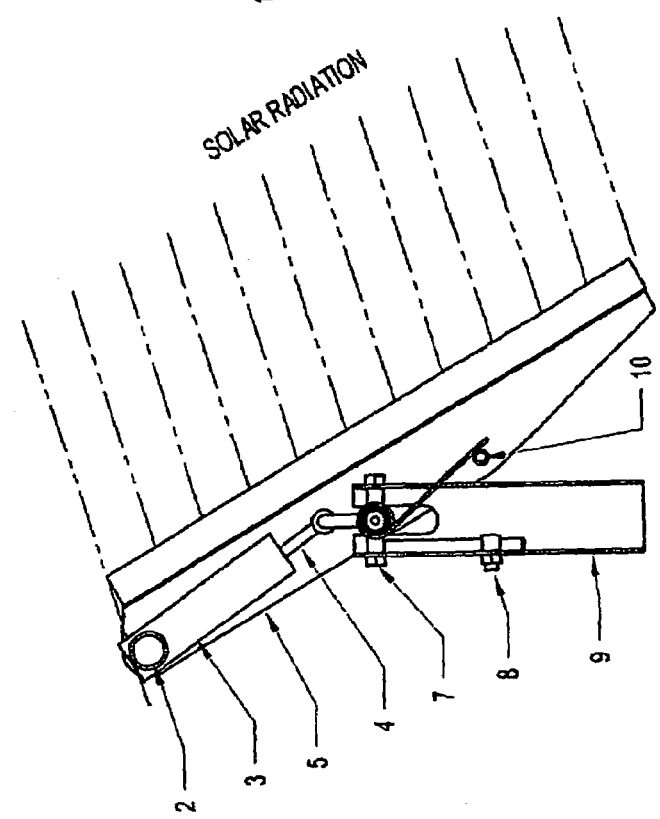

FIGS. 1-5 shows a single panel solar tracker in a preferred embodiment.

In FIG. 1 to FIG. 5, there is shown an embodiment where support post 9 has slots cut into the upper end to accommodate rotational displacement of the axis pivot tube 12. Post 9 has location holes bored through to house the north-south axis pivot bolt 7 and north south axis-positioning clamp 8. Movement of pivot tube 12 is restricted by axis bolt 7 so that it pivots in the north south direction only. Right-angled axis pin 30 and spring retainer tube 31 (see FIG. 5) are fixed to axis tube 12. Axis tube 12 is pierced to rotatingly mount the top end of clamp pin 14. Both ends of tube 12 are threaded for shoulder bolts 11. Lateral support brackets 5 and 6 are pivotally attached to tube 12 by bolts 11 and are held parallel by rod 10. Clamp plates 18 fix solar panel 1 to brackets 5 and 6. Locating holes provided in the inner end of brackets 5 and 6 pivotally retain expansion tube and hydraulic cylinder assembly 2 and 3. The hydraulic cylinder 3 is comprised of an outer pressure tight cylinder, a linear actuator ram 4, an adjustable gland or piston 15, a damper plate 16 and sealing "O" rings 17. A ferrule fixed to the outermost end of ram 4 is rotatingly mounted on right-angled pin 30.

The operation of the afore described embodiment commences when the sun begins to rise above the eastern horizon and the ambient air temperature increases; the liquid contained within expansion tube 2 and cylinder 3 also begins to expand. The liquid contained therein expands at a much greater rate than the surrounding container and a pressure is created which impinges on the cross sectional area of the ram 4 thus displacing it outward proportionally to the volumetric expansion of the liquid.

The liquid used in the device has a volumetric expansion rate of approximately 0.085 cubic centimeters per degree Celsius increase; therefore 1 liter of liquid will expand to 1008.5 cc when raised in temperature by 10 degrees Celsius. Liquid is considered to be virtually incompressible therefore the potential pressure created by this expansion is extremely high and can be considered limited only by the strength of the container which holds it. In the afore described embodiment this pressure is used to force ram 4 outward with a limiting factor of the enclosing structure and "O" rings 17.

The embodiment afore described is designed to rotate a P.V. (photovoltaic) panel 1 of approximately one square meter and contains a volume of liquid sufficient to displace an actuator ram of 12 mm dia. (1.13 square cm. cross sectional area) with a rise in temperature of 10 degrees Celsius, by 75 mm. and a pressure which is determined by the physical housing structure and sealing rings.

The sealing rings are conventional "O" rings, which are nominally considered to have a safe operating pressure of 1.03 MPa. This pressure can provide a rotational force of 119 kg, which is more than needed to rotate the panel. The excess force provided can be used to dynamically control the positioning of the panel under high wind loads by transposing the externally applied forces to the internal structure of tube 2 and cylinder 3 and elastically deforming said structure thus maintaining an equilibrium of forces during the day. This system has been tested and proven to maintain the face of a P.V. panel to within 10 degrees of perfect orientation, which is 98.5% of best possible positioning.

Different locations require different volumes of liquid and/or a liquid that has a higher or lower expansion rate than the embodiment afore described; this is easily compensated for by adjustment of the threaded gland 15 and/or using an expansion liquid that has characteristics better suited to the climatic conditions of the installation site.

Ambient temperatures usually increase at a steady rate during a normal climatic day and reach a maximum at about an hour after midday. When the increase in air temperature has rotated the P.V. panel to the horizontal position the expansion tube 2 is progressively exposed to solar radiation where the liquid contained therein continues to expand pushing the panel gradually toward the west. The liquid contained in tube 2 and cylinder 3 cools overnight permitting spring 13 to return solar panel 1 to the eastern most position. The liquid is selected for its optimum thermal expansion properties and the volume contained within the cylinder and the expansion tube is calculated to provide sufficient excess volume when heated to displace the ram outward from the cylinder and to rotate the panel assembly through approximately 70° by convection heating only.

Figure 4:
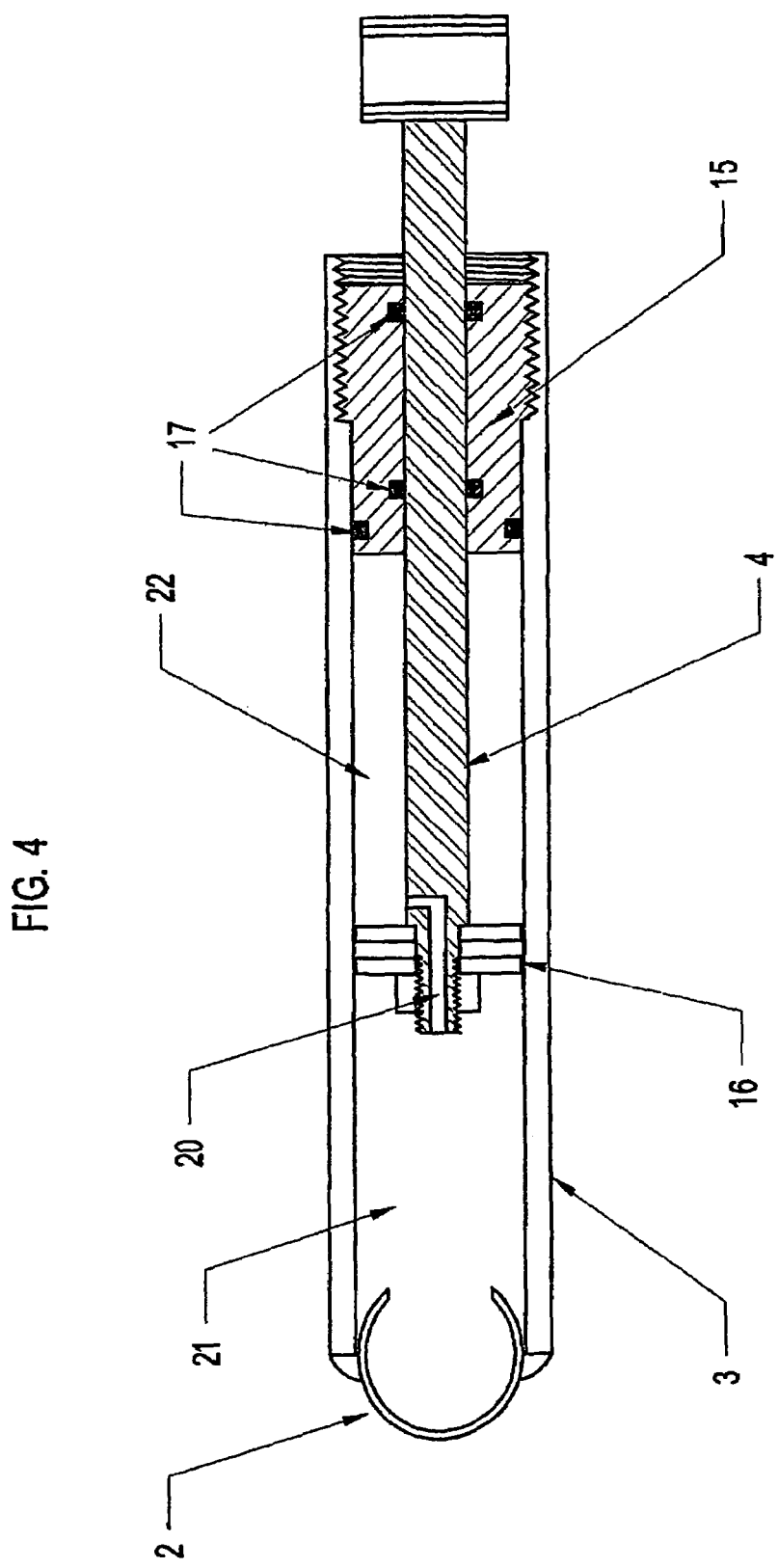
FIG. 4 is a sectional view of the hydraulic ram shown in FIG. 1
Figure 5:
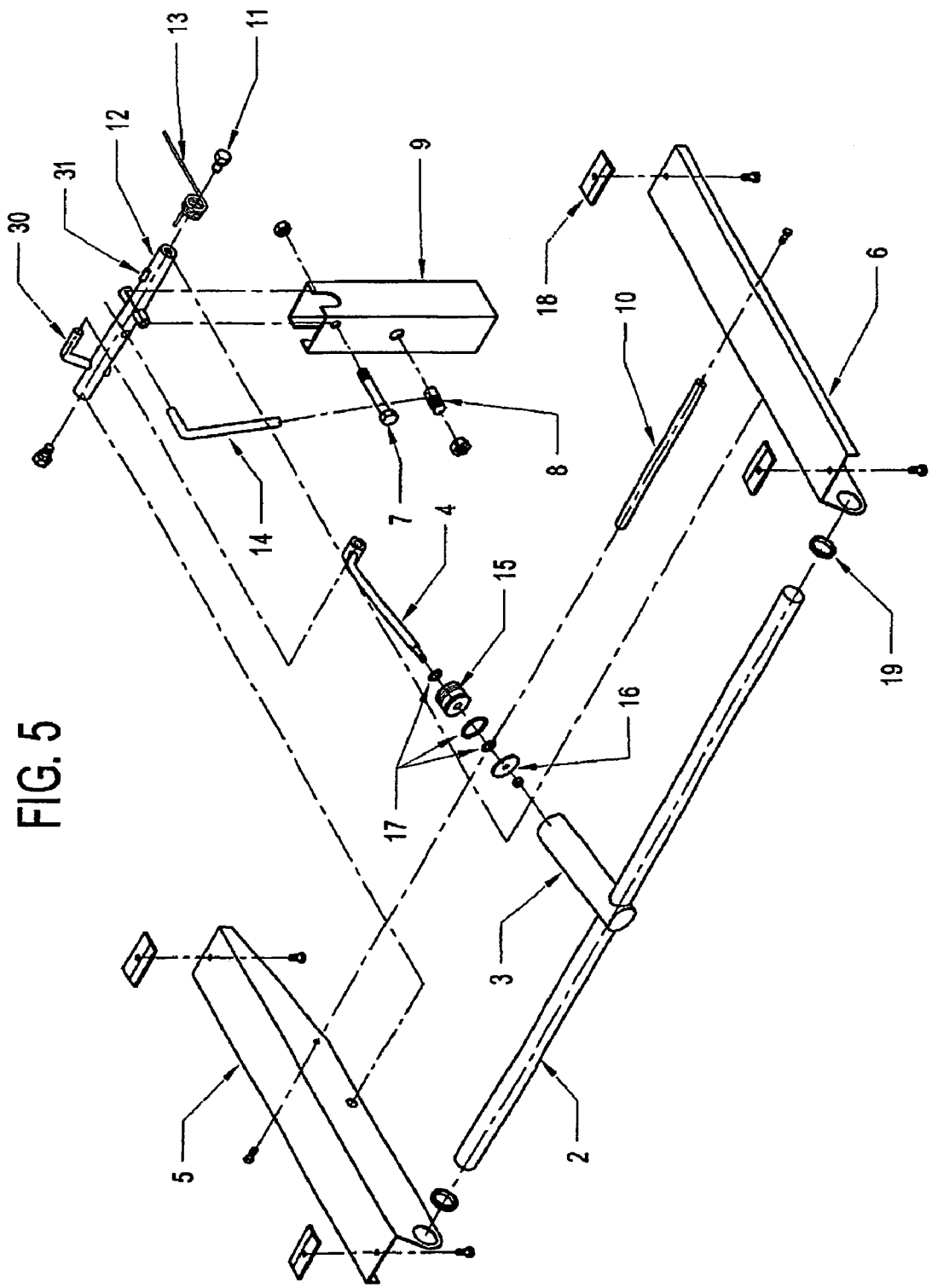
FIG. 5 is an exploded view of the device shown in FIG. 1
Figure 6:
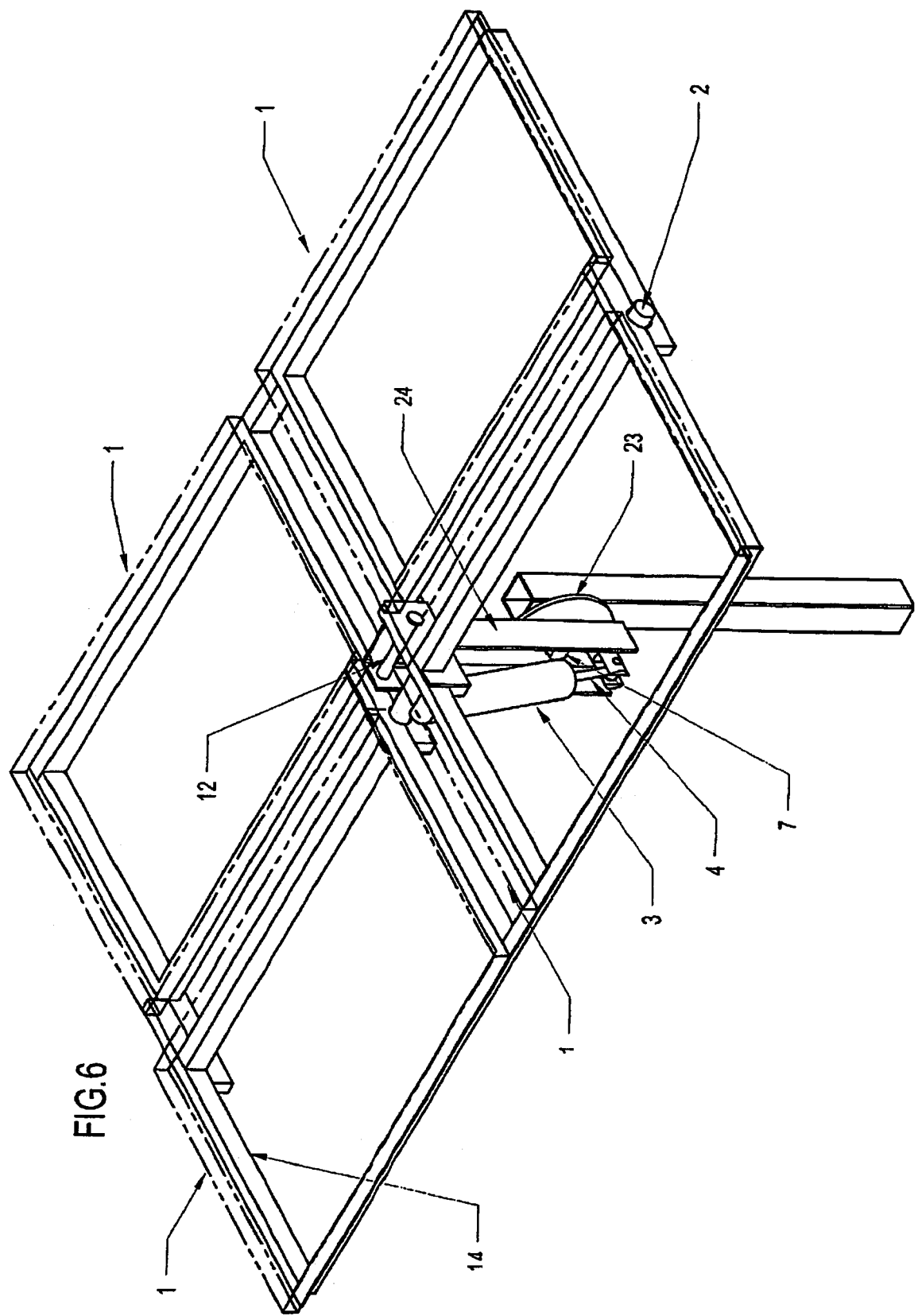
FIG. 6 is an isometric view of a preferred embodiment of a tracker and support frame for a multiple array of photovoltaic panels.
Figure 7:
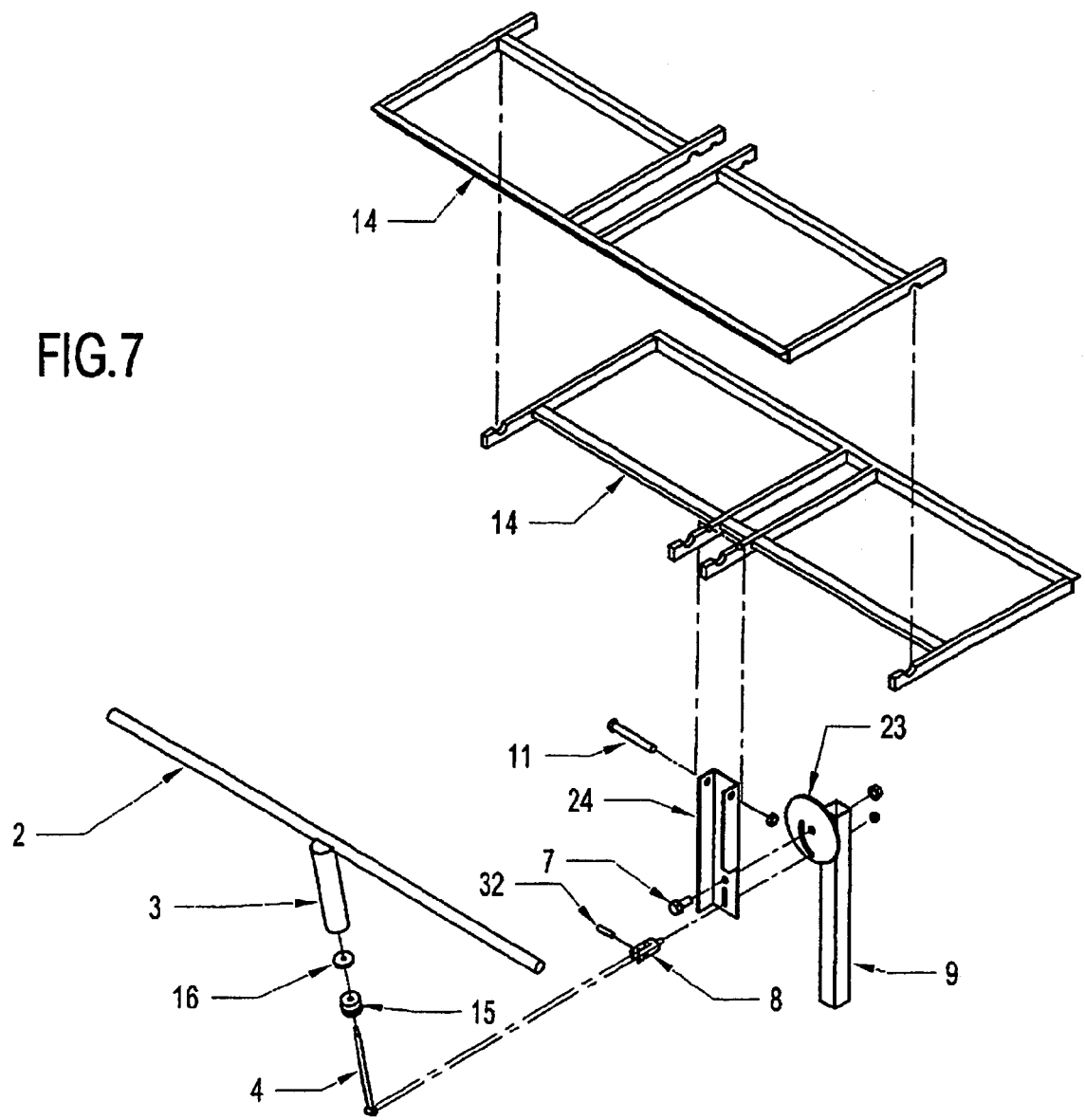
FIG. 7 is an exploded view of the device shown in FIG. 6

FIG. 4 shows a cross sectional view of hydraulic cylinder 3. Damper plate 16 is shown as a 3-piece assembly being composed of two outer plates of rigid material sandwiching a layer of resilient material that separates chambers 21 and 22 compelling excess fluid to flow to and fro via channel 20 bored into ram 4. This arrangement produces a dampening effect when the solar panel is exposed to high wind velocities. Liquid is permitted to slowly pass through a small canal maintaining a pressure balance in the chambers on either side of the damper plate. The hydraulic pressure provided by the expanding liquid is very high and combined with the damper plate the system readily handles high wind speed.

FIG. 6-FIG. 9 show another embodiment according to the invention where a plurality of solar panels 1 can be rotated simultaneously using the same basic expansion tube and hydraulic cylinder assembly as previously described. In this embodiment expansion tube 2 is located in a gap between two rows of solar panels 1, shown as phantom lines in FIG. 6 and partly shaded by frame 40. A ferrule fixed to the outermost end of ram 4 is rotatably mounted to north south axis bracket 24 by clevis 8 and pin 32. Circular plate 23 fixed to post 9 has a cam shaped slot and a central hole pierced through it (see FIG. 7). Bracket 24 is rotatably pinned to plate 23 by axis bolt 7 and clevis 8 passes through the slot in bracket 24 and cam slot in plate 23.

Figure 9B:
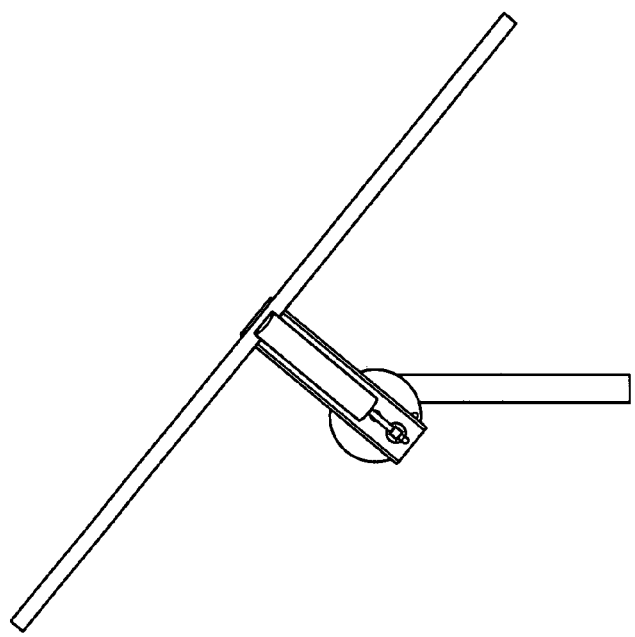
FIGS. 9A and 9B are side views of the device depicted in FIG. 6 (frame removed) showing north south orientation method.
Figure 9A:
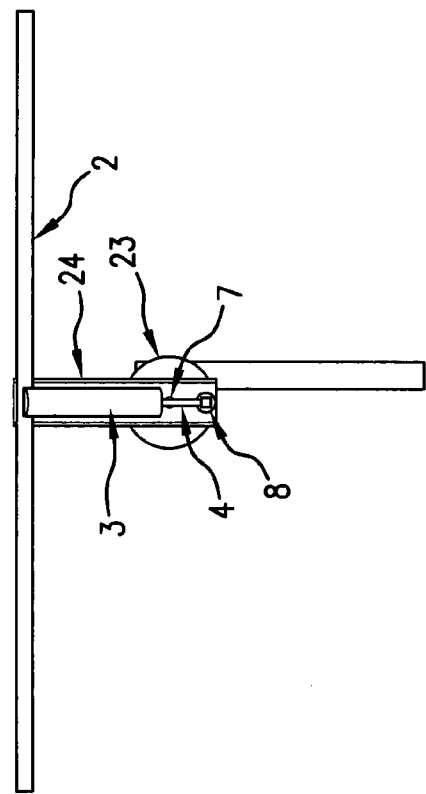

FIG. 9 shows that when bracket 24 and attached assembly is manually rotated to compensate for seasonal conditions, clevis 8 is moved by the curved surface of the cam shaped slot in plate 23 impinging on it. Clevis 8 moves closer to the cylinder 3 and attached ram 4 is moved further into said cylinder 3. This procedure automatically compensates for the reduced volume of liquid that is caused by seasonal cooling.

FIG. 8 shows that the principal of operation of the embodiment shown in FIGS. 6-9 is similar to that shown in the embodiment described by FIGS. 1-5.

FIG. 11 shows a method of positioning the PV panel to increase the potential output of the said panel through the application of a hydraulic cylinder as described by FIG. 4. The cylinder 36 contains a liquid that is calculated to provide an additional expansion volume so that no displacement of the ram will occur during the mid winter maximum temperature but will provide maximum expanded volume during the summer maximum daytime temperature. Cylinder 36 is connected via lower support 33 and upper support 34 to post 9 and is pivotally connected at 35 to support 34.

Figure 10:
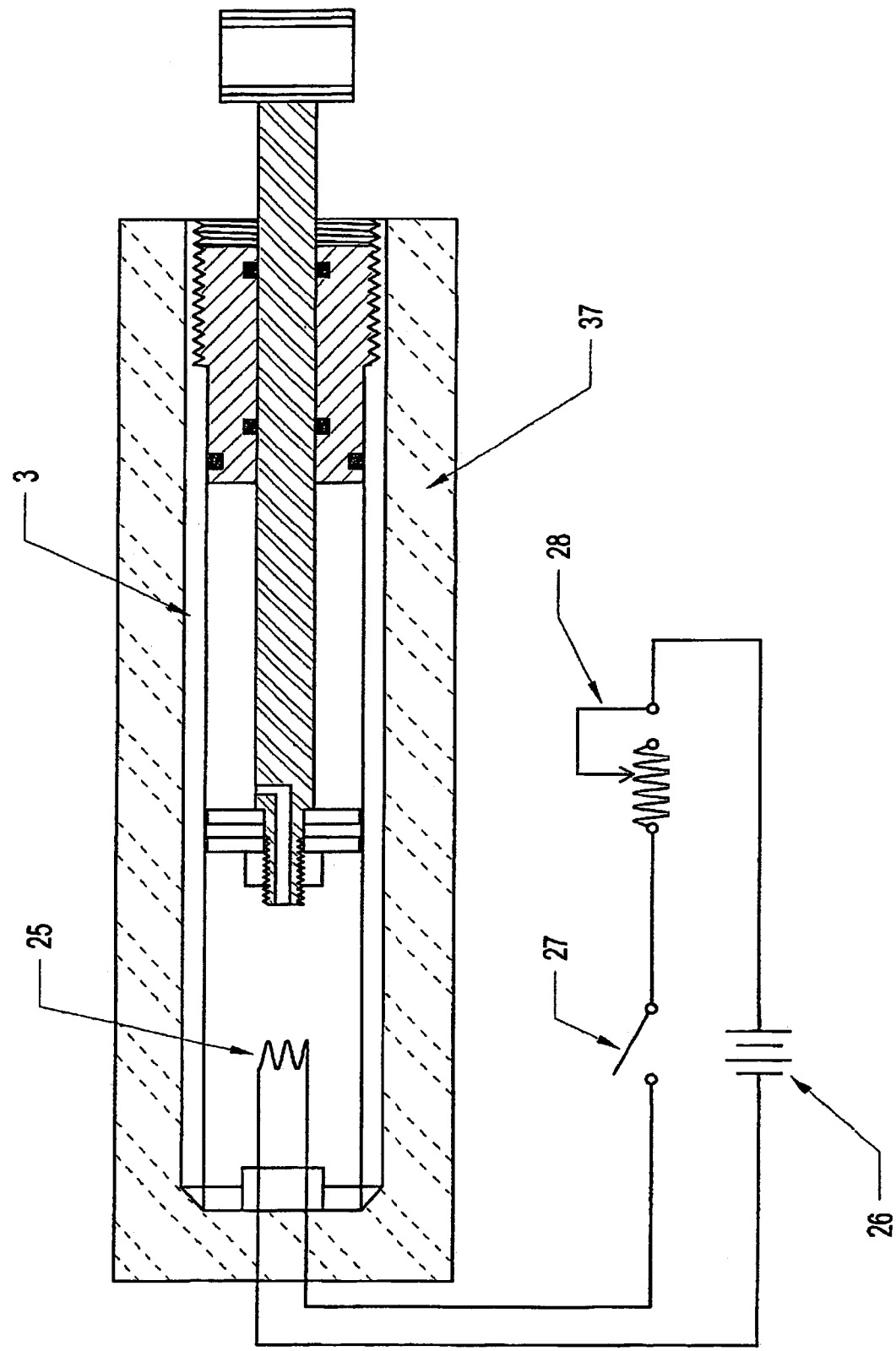
FIG. 10 shows a sectional view of an alternative thermal hydraulic cylinder, using electric power to heat the liquid.

FIG. 10 shows an alternative method of heating and expanding the liquid contained in hydraulic cylinder 3 where an electric current is provided by battery 26 through a circuit containing a rheostat 28, a cam operated micro switch 27 and heating element 25. The power required to rotate the PV panels is very low and for the operation of a one square meter panel, is less than one watt when cylinder 3 is encased with adequate thermal insulation material 37.

FIGS. 12a and 12b illustrates an embodiment to enable the apparatus to rotate about a vertical axis defined by post 9. This is achieved using a "rack and pinion" mechanism. Specifically, cylinder 3 contains a modified ram 4. Ram 4 is modified by having a rack 40 at the end of the ram 4 (particularly illustrated in figures 12b). The upper part of post 9 is provided with a pinion gear 41. Extension and retraction of ram 4 will cause rotation of the entire apparatus about post 9. A flexible hose 46 connects the expansion tube 2 to cylinder 3, cylinder 3 and ram 2 being provided with attachments nipples 38. Thrust washers 42, 43 are provided on the either side of pinion 41. Ram 4 can cause rotation of up to 270°. The apparatus illustrated in figures 12a and b is for the Southern Hemisphere and would have components fabricated in mirror reverse for the Northern Hemisphere.

It is envisaged that a windshield may be used to prevent excessive air convection currents from reducing the temperature of the liquid in the expansion tube or cylinder. The windshield may comprise a clear member which will still allow the expansion tube to absorb radiant heat. Alternatively, the windshield may be positioned in such a way to not hinder radiant or ambient heating but to still provide a shield against cooling winds.

It is further envisaged that the apparatus may be attached to a number of other supports which can also supports solar cells and where the other supports are all controlled by the cylinder on the apparatus using connecting means which may comprise rods, cables and the like. In this manner, the cylinder on the apparatus can be used to rotate a number of separate devices and the other devices can be quite simple constructions without a cylinder.

Although an advantage of the invention is that it does not require motors, batteries and the like, it is envisaged that the apparatus may include a small electric heater to heat the liquid if desired (see FIG. 10). The electricity for the small electric heater can be supplied by some of the solar cells.

The apparatus has many advantages. One advantage is that the liquid remains in a liquid state throughout the full operational parameters of the apparatus and the liquid is not artificially heated (for instance by parabolic mirrors) and is heated only by solar radiation or ambient air temperature.

Throughout the specification and the claims (if present), unless the context requires otherwise, the term "comprise", or variations such as "comprises" or "comprising", will be understood to apply the inclusion of the stated integer or group of integers but not the exclusion of any other integer or group of integers.

It should be appreciated that various other changes and modifications can be made to any embodiment described without departing from the spirit and scope of the invention.

What is claimed is:

1. A solar tracking apparatus movable from a morning position to an evening position,
    the apparatus comprising a support means to which a solar device can be supported,
    a cylinder, a ram which is extendable from and retractable into the cylinder, an expansion chamber which forms part of or which is in fluid connection with the cylinder and which is positioned at a point below the solar device,
    a liquid in the cylinder and the expansion chamber,
    the liquid having a boiling point which is greater than the maximum operating temperature of the cylinder and the expansion chamber such that the liquid does not undergo a phase transformation,
    a return means to cause the apparatus to be returned to the morning position, and
    rotation means associated with the ram, whereby extension of the ram causes the apparatus, including the expansion chamber, to rotate over an angle of up to 270° from the morning position to the evening position.

2. The apparatus of claim 1, wherein said support means includes a vertical post, and a rack and pinion mechanism is defined between said vertical post and said ram, to rotate the apparatus about a vertical axis to position, said apparatus for the Northern or Southern Hemisphere.

3. The rack and pinion mechanism of claim 2 comprising a pinion gear located at the upper end of said vertical post, and a rack defined at the end of said ram, said rack and pinion mechanism rotating said apparatus.

4. The apparatus of claim 1, which has a west-facing edge, the expansion chamber being located under the west-facing edge.

5. The apparatus of claim 1, comprising a plurality of solar devices supported by the support means.

6. The apparatus of claim 1, comprising a post, the support means being attached to the post and being able to swivel relative to the post.

7. The apparatus of claim 1, wherein expansion of the liquid in the expansion chamber causes the support means to swivel relative to the post.

* * * * *